United States Patent Office 3,206,448
Patented Sept. 14, 1965

3,206,448
POLYMERIZATION PROCESS AND CATALYST
Floyd E. Naylor, Bartlesville, Okla., assignor to Phillips Petroleum Company, a corporation of Delaware
No Drawing. Filed July 23, 1962, Ser. No. 211,838
6 Claims. (Cl. 260—94.3)

This invention relates to an improved polymerization process. In one aspect, it relates to the improvement of a polymerization catalyst.

The polymerization of 1,3-butadiene to produce rubbery polymers wherein a high percentage of the monomer concatenation is of the cis-1,4 type has recently evoked much interest in the rubber and chemical industries. These polymers are excellent materials for the manufacture of automobile tires. Several catalysts have been evolved which selectively promote such concatenation or enchainment during the polymerization reaction. Such catalysts are different from most polymerization catalysts of the organometal type, produced by intermixing an organometal compound, such as a trialkylaluminum or an alkylaluminum halide, with a transition metal compound, such as a titanium halide. The dialkylaluminum chlorides have previously been considered unsatisfactory as starting materials for the production of catalysts which selectively promote the polymerization of 1,3-butadiene to polymers in which a high proportion of the monomer concatenation, e.g. 85 percent or more, is of the cis-1,4 type.

The present invention provides a method by which a dialkylaluminum chloride can be utilized to form a catalyst which selectively promotes the polymerization of 1,3-butadiene to a rubbery polymer wherein the monomer concatenation is of the cis-1,4 type to the extent of 80 percent and higher.

An object of this invention is to provide an improved process for the polymerization of butadiene. Another object is to improve the selective polymerizing activity of a polymerization catalyst. A further object is to provide an improved polymerization catalyst. An additional object is to produce high yields of cis-1,4-polybutadiene.

According to this invention, an improved polymerization catalyst is obtained by intermixing a compound having the formula $R_2AlCl$, a titanium halide selected from the group consisting of titanium tetraiodide and mixtures of titanium tertaiodide with titanium tetrachloride, and at least one amine having the formula $R'_3N$ and from 1 to 25 carbon atoms per molecule. In the foregoing formulae, R is selected from the group consisting of alkyl, cycloalkyl and aryl radicals having from 1 to 20 carbon atoms each. R' is selected from the group consisting of hydrogen, alkyl, cycloalkyl, and aryl radicals, including hydrocarbon radicals, two of which join to form a heterocyclic nitrogen ring with said N. It will be understood by those skilled in the art that the foregoing definitions of R and R' include hydrocarbon radicals which represent more than one of the classifications stated, e.g. the definitions include aralkyl, alkaryl, aryl cycloalkyl, and cycloalkylaryl radicals.

Organoaluminum halides of the type hereinbefore discussed, prior to my invention, were generally unsuitable as compounds for producing catalysts which selectively promote the formation of high cis-1,4-polybutadienes. By the additional of amines in accordance with my invention, as hereinbefore indicated, a catalyst is obtained which promotes the polymerization of 1,3-butadiene to rubbery polymer in which as much as 85 percent or more of the concatenation of monomers is of the cis-1,4 type.

In accordance with my invention, 1,3-butadiene is polymerized to a rubbery cis-1,4-polybutadiene in the presence of a catalyst which results from the intermixing of an organoaluminum halide, titanium tetraiodide (with or without titanium tetrachloride), and an amine of the type hereinbefore described. The polymerization is ordinarily conducted by bringing togther the catalyst producing components and the butadiene and causing the reaction to proceed in equipment of the type generally used in the art for diene polymerization. The polymerization is conducted at a temperature in the range —100 to 250° F. It is generally unnecessary to utilize the extremes of this temperature range, and most frequently the polymerization is conducted within the range —30 to 160° F. In order to obtain optimum yields, the temperature preferred is within the range 30 to 100° F.

It is often desirable, from the standpoint of good heat transfer and control of reaction mixture viscosity, to conduct the polymerization in the presence of a diluent or solvent for the monomer and polymer. Suitable diluents and solvents are hydrocarbons which are liquid and chemically inert under the reaction conditions. In general, these hydrocarbons are selected from the group consisting of paraffinic, cycloparaffinic and aromatic hydrocarbons. Examples of suitable diluents are normal heptane, 2,2,4-trimethylpentane, normal octane, 2,4-dimethylheptane; neohexane, normal dodecane, normal pentane, benzene, toluene, the xylenes, cyclopentane, methylcyclopentane, cyclohexane, methylcyclohexane and the dimethylcyclohexanes.

Suitable examples of organoaluminum halides useful in the production of catalyst in accordance with this invention are dimethylaluminum chloride, diethylaluminum chloride, di-n-propylaluminum chloride, di-tert-butylaluminum chloride, di-n-hexylaluminum chloride, didecylaluminum chloride, di(tridecyl) aluminum chloride, dieicosyl-aluminum chloride, dicyclohexylaluminum chloride, di-4-methylcyclohexylaluminum chloride, dibenzylaluminum chloride, di(4-phenyl-n-butyl)aluminum chloride, diphenylaluminum chloride, di-1-naphthylaluminum chloride, di-4-tolylaluminum chloride, di(2,4-diethylphenyl)aluminum chloride, di(3,5 - di - n - heptylphenyl)aluminum chloride, methylethylaluminum chloride, methylphenylaluminum chloride, and butylbenzylaluminum chloride.

As previously indicated, the titanium tetraiodide can be used alone or in admixture with titanium tetrachloride. Since titanium tetrachloride is a liquid, the advantage of using the mixed chloride and iodide is at once apparent, since the titanium iodide (normally solid) is thus brought into admixture with the other catalyst ingredients more readily when the liquid tetrachloride is present. It is desired that at least 10 percent of the total titanium added to form the catalyst be present in the form of the tetraiodide initially.

Specific examples of amines include the primary, secondary, and tertiary amines, such as trimethylamine, triethylamine, diethylamine, monomethylamine, n-propylamine, isopropylamine, di-n-propylamine, n-butylamine, di-n-butylamine, cyclohexylamine, benzylamine, methyldiethylamine, tri-n-butylamine, pyridine, piperidine, monopentacosylamine, pentyldidecylamine, trioctylamine, tri(3-ethylcyclopentyl)amine, and the like.

It will be readily recognized by those skilled in the art that the foregoing lists of specific examples of compounds utilizable to form the catalyst in accordance with this invention are not exhaustive. Many additional examples will suggest themselves to those skilled in the art upon consideration of this disclosure.

The amounts of catalyst ingredients to be charged to the reaction mixture can conveniently be expressed in terms of the total titanium used. The mol ratio of the amine to total titanium is within the range 1.5:1 to 4:1, optimum catalytic activity being obtained in the range 1.5:1 to 3:1. While operability outside these ranges can be achieved, it frequently is achieved at a sacrifice in conversion rate. The mol ratio of the organoaluminum halide to total titanium used to form the catalyst is generally within the range 4:1 to 15:1. Again, while operation outside this range is possible, optimum yields and rates are obtained within the stated range.

Sufficient of the catalyst-producing mixture is added to the reaction mixture to have present from 1 to 20 gram millimoles of the organoaluminum halide per hundred parts by weight of 1,3-butadiene monomer charged. A measure of control of the molecular weight can generally be achieved by variation of the amount of the catalyst-producing ingredients charged to the reaction mixture. Low catalyst concentrations tend to form polymers of high molecular weight, while higher catalyst concentrations tend to form lower molecular weights. Also, higher cis contents are generally correlatable with increasing ratio of the organoaluminum halide to titanium. In addition, the higher temperatures within the specified temperature ranges tend to promote a decrease in the cis-1,4 content of the polymer.

An advantageous method of conducting the polymerization reaction comprises mixing together the organoaluminum halide, the titanium halide or halides and the amines and causing the resulting mixture to stand at room temperature or slightly higher, e.g. up to about 120° F., for several hours. During this aging process, the diluent, or part thereof, can be present if desired. The monomer is then charged and the polymerization caused to proceed, utilizing the techniques generally known in the art for polymerizing olefinic compounds with organometal catalysts. Also, the recovery of the polymer from the reaction zone effluent proceeds in accordance with techniques known in the art.

Example I

Polymerization runs were conducted utilizing the following recipe and reaction conditions:

| | Parts by weight |
|---|---|
| 1,3-butadiene | 100 |
| Toluene | 1200 |
| Diethylaluminum chloride (DEAC) | Variable |
| Triethylamine (TEAM) | Variable |
| Titanium tetraiodide (TTI) | Variable |
| Temperature, °F. | 41 |
| Time, hours | 70 |

The toluene diluent was first charged to the reactor. The reactor was then purged with nitrogen. The butadiene, the diethylaluminum chloride, and the amine were added in that order. The reaction was initiated by the addition of a dispersion of titanium tetraiodide in toluene. The following data were obtained:

| Run No. | DEAC mhm. [1] | TEAM mhm. [1] | TTI mhm. [1] | Conversion, percent | Inh. Visc. | Microstructure, percent | | |
|---|---|---|---|---|---|---|---|---|
| | | | | | | Cis [2] | Trans | Vinyl |
| 1 | 3.0 | 1.0 | 0.5 | 100 | 3.98 | 84.3 | 12.7 | 3.0 |
| 2 | 3.0 | 1.5 | 0.75 | 100 | 3.80 | 82.3 | 14.5 | 3.2 |
| 3 | 2.4 | 0.8 | 0.4 | 100 | 3.66 | 91.4 | 5.7 | 2.9 |
| 4 | 2.4 | 1.2 | 0.6 | 100 | 4.25 | 81.7 | 15.7 | 2.6 |
| 5 | 2.4 | 0.0 | 0.4 | 0 | | | | |

[1] Millimoles per 100 parts monomer.
[2] By difference.

The data in the foregoing tabulation demonstrate the effect of triethylamine in increasing the selective polymerizing effect of the catalyst to produce a rubbery polybutadiene having high cis content.

Example II

Several runs were made in which 1,3-butadiene was polymerized in accordance with the following recipe and reaction conditions:

| | Parts by weight |
|---|---|
| 1,3-butadiene | 100 |
| Toluene | 1200 |
| Diethylaluminum chloride (DEAC) (3.0 mhm.) | 0.36 |
| Titanium tetraiodide (TTI) (0.43 mhm.) | 0.24 |
| Amine | Variable |
| Temperature, °F. | 41 |
| Time, hours | 21 |

The reaction procedure was the same as in Example I. Results obtained are shown in the following table:

| Run No. | Amine | | Amine/Ti, mol ratio | Conv., percent | Inh. Visc. [1] | Microstructure, percent | | |
|---|---|---|---|---|---|---|---|---|
| | Type | mhm. | | | | Cis [2] | Trans | Vinyl |
| 1 | Triethyl | 0.86 | 2/1 | 70 | 3.56 | 93.0 | 4.0 | 3.0 |
| 2 | Triethyl | 0.97 | 2.2/1 | 93 | 4.66 | 90.5 | 6.3 | 3.2 |
| 3 | Diethyl | 0.86 | 2/1 | [3] 88 | 3.83 | 91.7 | 4.8 | 3.5 |
| 4 | Diethyl | 1.07 | 2.5/1 | [3] 93 | 3.99 | 91.6 | 4.1 | 4.3 |
| 5 | n-Butyl | 1.07 | 2.5/1 | 80 | 4.12 | 93.0 | 3.8 | 3.2 |
| 6 | Pyridine | 0.86 | 2/1 | [3] 59 | 2.88 | 92.5 | 4.0 | 3.5 |
| 7 | Pyridine | 0.97 | 2.2/1 | [3] 65 | 3.15 | 93.0 | 3.3 | 3.7 |

[1] Polymers were gel free.
[2] By differences.
[3] Polymerizations had not started after 21 hours at 41° F. Reactions caused to proceed for 4 hours at 86° F.

The promoting effect of each of the amines is clearly shown. Also, in these runs the mol ratio of diethylaluminum chloride to titanium tetraiodide was 7:1, which was accompanied by product polymers wherein the cis-1,4 content was above 90 percent.

Example III

Several additional runs were conducted in accordance with the following recipe:

| | Parts by weight |
|---|---|
| 1,3-butadiene | 100 |
| Toluene | 1200 |

|   | Parts by weight |
|---|---|
| Diethylaluminum chloride(DEAC) (3.0 mhm.) | 0.36 |
| Titanium tetraiodide (TTI) | Variable |
| Triethylamine (TEAM) | Variable |
| Pyridine (Py) | Variable |
| Temperature, °F. | 41 |
| Times, hours | 120 |

In each run, toluene was charged to the reactor, which was then purged with nitrogen. A toluene solution of diethylaluminum chloride was then added. The amine was then added in hydrocarbon solution. The butadiene was then added and, finally, the titanium tetraiodide dispersed in toluene was charged. Each reaction was shortstopped with a solution of 2,2'-methylene-bis(4-methyl-6-tert-butylphenol). Shortstop was added in solution in a 50–50 (volume) mixture of toluene and isopropanol. This represents 1 part by weight of the phenolic compound in 100 parts by weight of the product elastomer. The mixture was then coagulated with isopropyl alcohol and the coagulated elastomer was separated and dried. The results are presented in the following tabulation:

| TEAM, mhm. | TTI, mhm. | Py, mhm. | Amine/Ti Mol ratio | Conv. percent | Inh. Visc. | Microstructure, percent | | |
|---|---|---|---|---|---|---|---|---|
|  |  |  |  |  |  | Cis [1] | Trans | Vinyl |
| 0.7 | 0.375 | ---- | 2/1 | 60 | 2.43 | 94.5 | 2.4 | 3.1 |
| 0.6 | 0.30 | ---- | 2/1 | 40 | 2.33 | 94.4 | 2.5 | 3.1 |
| ------- | 0.30 | 0.6 | 2/1 | 15 | 2.24 | 94.4 | 2.5 | 3.1 |

[1] By difference.

The foregoing data show high cis contents obtainable at Al:Ti mol ratios as high as 10:1.

*Example IV*

Several runs were performed wherein butadiene was polymerized to cis-1,4-polybutadiene and the titanium tetraiodide was charged in admixture with titanium tetrachloride. The following recipe was used:

|   | Parts by weigth |
|---|---|
| 1,3-butadiene | 100 |
| Toluene | 1200 |
| Diethylaluminum chloride(DEAC) (3.0 mhm.) | 0.36 |
| Titanium tetraiodide (TTI) (0.21 mhm.) | 0.12 |
| Titanium tetrachloride (TTC) (0.21 mhm.) | 0.04 |
| Triethylamine (TEAM) | Variable |
| Temperature, °F. | 41 |
| Time, hours | 21 |

The data obtained are shown in the following tabulation:

| TEAM, mhm. | TEAM/Ti, mol ratio | Conv., percent | Inh. Visc. | Microstructure, percent | | |
|---|---|---|---|---|---|---|
|  |  |  |  | Cis [1] | Trans | Vinyl |
| 0.43 | 1/1 | 35 | ---- | ---- | ---- | ---- |
| 0.64 | 1.5/1 | 56 | ---- | ---- | ---- | ---- |
| 0.86 | 2/1 | 89 | 2.82 | 87.4 | 9.6 | 3.0 |
| 0.96 | 2.3/1 | 94 | 2.58 | 87.6 | 9.6 | 2.8 |
| 1.07 | 2.5/1 | 89 | 2.72 | 87.1 | 10.1 | 2.8 |

[1] By difference.

Data in the table show the beneficial or promoting effect of the triethylamine on the catalyst when the triethylamine was charged in a ratio of at least 1.5:1 (based on moles of titanium) into the reaction mixture. Below this ratio, lower conversions were obtained.

In addition to the foregoing, the following are specific examples of combinations of catalyst-producing ingredients in accordance with this invention, the numbers in parentheses indicating relative molar proportions:

Di-(n-butyl)-aluminum chloride (6)
Titanium tetraiodide (1)
Monomethylamine (3)

Diisobutyl aluminum chloride (7)
Titanium tetraiodide (0.5)
Titanium tetrachloride (0.5)
Monoisopropylamine (2.5)

Phenyl ethyl aluminum chloride (9)
Titanium tetraiodide (1)
Aniline (3)

Polymer samples were dissolved in carbon disulfide to form a solution having 25 grams of polymer per liter of solution. The infrared spectrum of each of the solutions (percent transmission) was then determined in a commercial infrared spectrophotometer.

The percent of the total unsaturation present as trans 1,4- was calculated according to the following equation and consistent units:

$$\epsilon = \frac{E}{tc}$$

where $\epsilon$ equals extinction coefficient (liters-mols$^{-1}$-centimer$^{-1}$); E equals extinction (log $I_0/I$); $t$ equals path length (centimeters); and $c$ equals concentration (mols double bond/liters). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedures, from the total theoretical unsaturation, assuming one double bond per each $C_4$ unit in the polymer.

I claim:

1. A process for obtaining a polymer of butadiene having at least 80 percent cis-1,4-addition which comprises polymerizing butadiene in the presence of a catalyst formed by intermixing components consisting of a compound having the formula $R_2AlCl$, a titanium halide selected from the group consisting of titanium tetraiodide and mixtures thereof with titanium tetrachloride, and at least one amine having the formula $R'_3N$ and from 1 to 25 carbon atoms per molecule, R being selected from the group consisting of alkyl, cycloalkyl and aryl radicals having from 1 to 20 carbon atoms each, and each R' being selected from the group consisting of hydrogen, alkyl, cycloalkyl and aryl radicals, including hydrocarbon radicals two of which join to form a heterocyclic nitrogen ring with said N, wherein the polymerization temperature is within the range 30 to 100° F., the reaction is conducted in a hydrocarbon diluent medium which is chemically inert under the reaction conditions, the ratio of aluminum compound to total titanium is in the range 4:1 to 15:1, and the mol ratio of said amine to titanium is in the ratio 1.5:1 to 4:1.

2. A process according to claim 1 wherein said amine is triethylamine, said halide is titanium tetraiodide and said $R_2AlCl$ is diethylaluminum chloride.

3. A process according to claim 1 wherein said amine is diethylamine, said titanium halide is titanium tetraiodide and the aluminum compound is diethylaluminum chloride.

4. A process according to claim 1 wherein said amine is normal butyl amine, said titanium halide is titanium tetraiodide and the aluminum compound is diethylaluminum chloride.

5. The process according to claim 1 wherein said amine is pyridine, said titanium halide is titanium tetraiodide and the aluminum compound is diethylaluminum chloride.

6. The process accordng to claim 1 wherein said amine is triethylamine, said titanium halide is a mixture of titanium tetraiodide and titanium tetrachloride and the aluminum compound is diethylaluminum chloride.

References Cited by the Examiner
UNITED STATES PATENTS

| | | | |
|---|---|---|---|
| 3,905,406 | 6/63 | Short et al. | 260—94.3 |
| 3,099,648 | 7/63 | Dye | 260—94.3 |

FOREIGN PATENTS

| | | |
|---|---|---|
| 585,827 | 6/60 | Belgium. |
| | | (Corresponds to 877,661, Great Britain) |
| 1,223,391 | 2/60 | France. |
| 809,717 | 3/59 | Great Britain. |

JOSEPH L. SCHOFER, *Primary Examiner*.